March 28, 1961 L. PÉRAS 2,976,981
ROLLER-TYPE CONVEYOR FOR TRANSPORTING LOADS
Filed April 4, 1956 2 Sheets-Sheet 1

INVENTOR.
LUCIEN PÉRAS
BY
ATTORNEY

March 28, 1961 L. PÉRAS 2,976,981
ROLLER-TYPE CONVEYOR FOR TRANSPORTING LOADS
Filed April 4, 1956 2 Sheets-Sheet 2
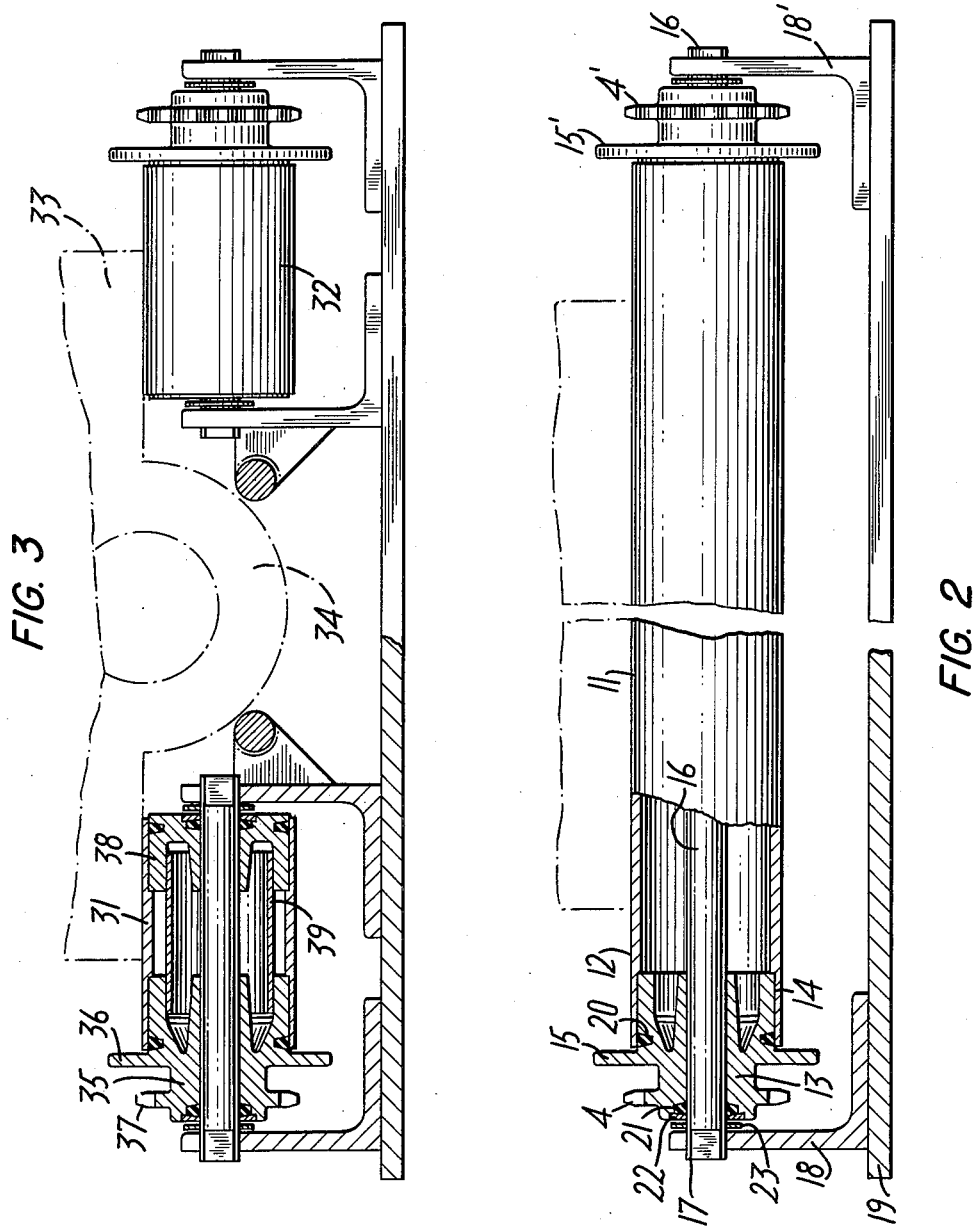
INVENTOR.
LUCIEN PÉRAS
BY 
ATTORNEY United States Patent Office 2,976,981
Patented Mar. 28, 1961

2,976,981

ROLLER-TYPE CONVEYOR FOR TRANSPORTING LOADS

Lucien Péras, Billancourt, France, assignor to Regie Nationale des Usines Renault, Billancourt, France Filed Apr. 4, 1956, Ser. No. 576,019

Claims priority, application France Apr. 7, 1955

4 Claims. (Cl. 198—127)

The invention relates to roller-type conveyors in which the loads are moved by rollers which are driven in rotational movement.

Handling installations wherein the loads are moved along tracks formed by parallel rollers are constructed either with freely rotatable rollers, in which case the loads are advanced gravitationally or under the effect of a pushing action, or else with driven rollers which are driven, for example, by gears and chains, in which case the loads are moved by the rotation of these driven rollers. In known constructions, the said driven rollers are fast with their driving shafts and therefore rotate during the whole of the time during which the driving means of the installation is in operation.

However, installations of the driven-roller type have a few disadvantages, more particularly when they are used for handling mechanical parts in machining or assembly shops. In fact, the parts conveyed may abut against a fixed point, this possibly taking place accidentally or owing to the action of safety or output regulating devices.

In this case, the stopped parts may arrest the rollers by adhering thereto and thus stop the whole propulsion system, in such a manner that the movement of parts, which are situated at other points along the path of conveyance and which are not encountering abutments, is also stopped. If, on the other hand, the stopped load is insufficiently heavy to stop the rotation of the rollers, the latter rub against the faces of the parts which are in contact with them and may damage the said faces, which is particularly unfortunate when the parts being handled are machined mechanical parts.

The conveyor according to the invention makes it possible to obviate these disadvantages. According to the invention, this conveyor is constructed with rollers which are frictionally driven by support elements which are continuously entrained in rotational movement by the driving elements of the installation. When, in an installation of this kind, a load is prevented from moving, the only rollers which are stopped are those carrying the said load, whilst the driving and support elements continue to rotate. The stopped load therefore bears on stationary rollers, but the rest of the driving system is not locked and the other loads can continue to travel.

A handling installation equipped with driven rollers according to the invention will now be described by way of non-limitative example with reference to the accompanying drawings wherein:

Fig. 2 is a side view, partly in section, of a conveyor roller according to the invention;

Fig. 3 is a side view, partly in section, of a different form of embodiment of the conveyor roller.

Figure 1:
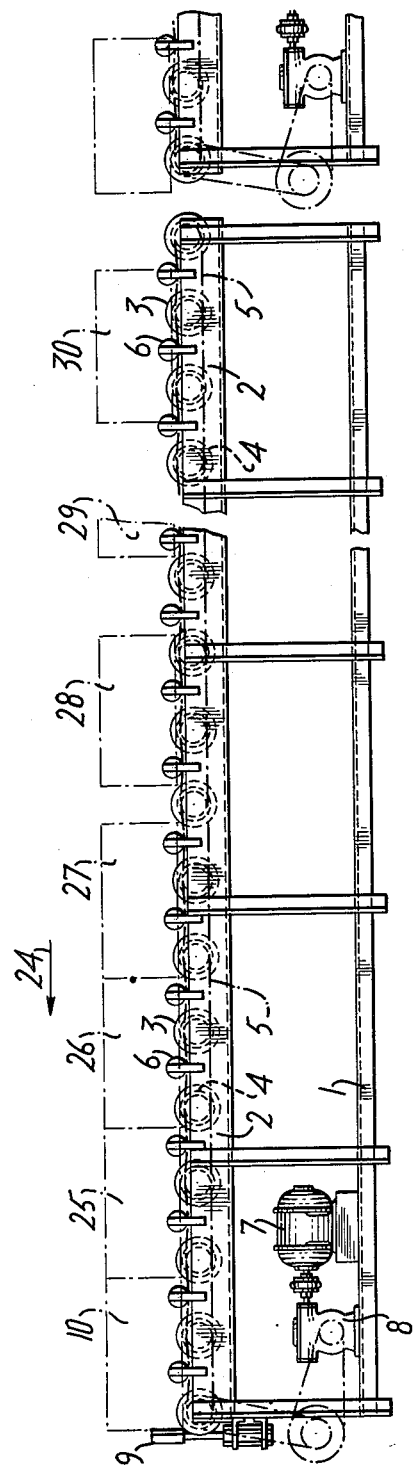
Fig. 1 is a general elevational view of the installation.

The roller-type conveyor, as illustrated in Fig. 1, comprises essentially a frame 1 which supports, by means of longitudinal bearers 2, rollers 3 which carry pinions 4. The latter are driven by a chain 5 which is made to bear against the pinions by wheels 6, the chain being driven by an electric motor 7 which is coupled to a speed-reducing gear 8. The end of the conveyor is provided with a movable stop 9 which is capable of arresting the advance of parts such as 10.

A roller according to the invention is illustrated in Fig. 2. It comprises a cylindrical sleeve 11 which is intended to carry the load being conveyed, and whose machined ends such as 12 contain end caps, one of which has been illustrated at 13, and the sleeve is adapted to rotate fairly freely on the machined cylindrical bearing surface 14 of the said end caps.

Each end cap comprises a lateral cheek 15 serving to guide the articles conveyed, and a pinion 4 which cooperates with the chain 5 (not shown in Fig. 2) which drives the rollers. The end caps 13 rotate freely on a carrier shaft 16 which is keyed by flattened portions 17 in slots formed in the longitudinal bearers 18 and 18' carried by a sole piece forming part of the frame 1. Sealing rings 20 and 21, a washer 22 for clamping the sealing arrangement, and a washer 23 for adjusting lateral play, complete the end cap. The arrangement is of course the same in the case of the end cap situated at the other extremity of the sleeve. Only the pinion 4', the lateral cheek 15', the carrier shaft 16 and the longitudinal bearer 18' have been illustrated.

A conveyor equipped with rollers according to the invention operates as follows: when the end caps 13 are driven in rotation by their pinions 4 and 4', they drive the sleeves 11 owing to the friction of the surfaces 14 against the said sleeves. The loads are shifted, for example, in the direction of the arrow 24 (Fig. 1). As soon as a conveyed load is stopped, for example the articles 10, 25, 26 and 27 in Fig. 1, the sleeves on which the said articles are carried are stopped owing to the friction of the loads on the sleeves, whilst the end caps and, consequently, the whole of the driving system continues to move. This has the advantage of protecting the surfaces of the articles in contact with the sleeves and of not preventing the movement of the other articles such as 28, 29 and 30 (Fig. 1) which continue to advance until they abut against the articles which have been stopped. The conveyor thus accumulates articles over its entire length.

As soon as one article is lifted from the conveyor, all the others advance a distance corresponding to the length of the article which has been removed, and thus provide new space on the conveyor. The latter can thus ensure the uniform supply of a working station or can ensure that a reserve of articles is maintained.

However it should be noted that the resistant force opposing the movement of the loads must not normally be greater than the frictional force of the end caps 13 in the sleeves 11, since in that case the loads would remain stationary, whilst the end caps driven by the driving system would rotate in the sleeves without entraining them. This does not occur, since if the conveyor installation is horizontal, the resistant effort is negligible. Moreover, if it assumed a substantial value, by reason of the nature or state of the surface of the sleeves, it could be reduced as the user desired by installing the conveyor with a slight downward inclination in the direction of movement of the articles. The sleeves also comprise an end cap at each extremity, which makes it possible to apply maximum driving force to the rollers.

A roller according to the invention, and which is intended more particularly to handle articles comprising a projecting portion is illustrated in Fig. 3. It comprises two sleeves 31 and 32 which carry the plane surfaces of the article which is to be conveyed, a motor casing 31 in the example shown in Fig. 3, and the projecting portion 34 of the said casing occupies the space between the two half-rollers. One of the said half-rollers has been illustrated in cross-section. These sleeves 31 and 32 may be covered with a lining (not shown) made of rubber or other material for improved adherence to the articles being conveyed.

As is shown in Fig. 3, one of the ends of the sleeve 31 contains an end cap 35 having a lateral cheek 36 and pinion 37, the said end cap corresponding to the element 13 in Fig. 2. The other extremity of the sleeve contains an end cap 38 which is connected to the end cap 35 by a tube 39 of angular cross-section which extends into housings formed in the two end caps. This method of driving the sleeve is particularly effective, but of course the sleeve may be driven by means of a single end cap. The arrangement of the driving members of the sleeve 32 is in every way similar to that which has just been described.

The sleeves 11, 31 and 32 are generally made of steel, but they may be constructed from any other material, and may or may not be covered with rings or linings for increased adherence and for protecting the articles being conveyed from any shock which might damage their bearing surface.

The end caps will preferably be made of plastic material or of fritted metals ensuring prolonged operation without any risk of jamming. Their internal and external diameters will be chosen in accordance with the weight and bulk of the articles being transported.

I claim:

1. A roller-type conveyor for handling mechanical parts and the like comprising, in combination, a frame, a plurality of spindles fixedly supported by said frame, and a plurality of driven rollers rotatably mounted upon said fixed spindles, each of said rollers comprising a cylindrical sleeve element and a pair of unitary end members each having integral portions extending partially into said sleeve element in frictional engagement therewith, at least one of said end members having an integral sprocket adapted to receive driving means to rotate said rollers, each of said end members being a single wholly integral unit and being formed from a material selected from the group consisting of plastic material and fritted metals, and said sleeve element being normally rotatable by said integral end portions of said end members but being adapted to remain stationary during continued rotation of said end portions when the frictional engagement between said sleeve element and its associated end portions is overcome by the weight of the load acting upon said sleeve element when said load is stopped.

2. A roller-type conveyor for handling mechanical parts and the like comprising, in combination, a frame, a plurality of spindles fixedly supported by said frame, and a plurality of driven rollers rotatably mounted upon said fixed spindles, each of said rollers comprising a cylindrical sleeve element and a pair of unitary end members each having integral portions extending partially into said sleeve element in frictional engagement therewith, both of said end members having an integral sprocket adapted to receive driving means to rotate said rollers, and sealing rings between said sleeve element and each end member and between each end member and the associated spindle, each of said end members being a single wholly integral unit and being formed from a material selected from the group consisting of plastic material and fritted metals, and said sleeve element being normally rotatable by said integral end portions of said end members but being adapted to remain stationary during continued rotation of said end portions when the frictional engagement between said sleeve element adn its associated end portions, including the engagement with said sealing rings, is overcome by the weight of the load acting upon said sleeve element when said load is stopped.

3. A roller-type conveyor for handling mechanical parts and the like comprising, in combination, a frame, a plurality of spindles fixedly supported by said frame, and a plurality of driven rollers rotatably mounted upon said fixed spindles, each of said rollers comprising a cylindrical sleeve element and a pair of unitary end members each having integral portions extending partially into said sleeve element in frictional engagement therewith, both of said end members having an integral sprocket adapted to receive driving means to rotate said rollers, and both of said end members being formed with radially-extending flanges adjacent the ends of the associated sleeve element to limit lateral movement of the article being conveyed, and sealing rings between said sleeve element and each end member and between each end member and the associated spindle, each of said end members being a single wholly integral unit and being formed from a material selected from the group consisting of plastic material and fritted metals, and said sleeve element being normally rotatable by said integral end portions of said end members but being adapted to remain stationary during continued rotation of said end portions when the frictional engagement between said sleeve element and its associated end portions, including the engagement with said sealing rings, is overcome by the weight of the load acting upon said sleeve element when said load is stopped.

4. A roller-type conveyor for handling mechanical parts and the like comprising, in combination, a frame, a plurality of spindles fixedly supported by said frame, and a plurality of driven rollers rotatably mounted upon said fixed spindles, said spindles and rollers being arranged in axially-spaced-apart pairs and each of said rollers comprising a cylindrical sleeve element and unitary end members each having integral portions extending partially into said sleeve element in frictional engagement therewith, the axially-outermost of said end members having an integral sprocket adapted to receive driving means to rotate said rollers, and sealing rings between said sleeve element and each end member and between each end member and the associated spindle, each of said end members being a single wholly integral unit and being formed from a material selected from the group consisting of plastic material and fritted metals, and said sleeve element being normally rotatable by said integral end portions of said end members but being adapted to remain stationary during continued rotation of said end portions when the frictional engagement between said sleeve element and its associated end portions, including the engagement with said sealing rings, is overcome by the weight of the load acting upon said sleeve element when said load is stopped.

References Cited in the file of this patent

UNITED STATES PATENTS

| | | |
|---|---|---|
| 1,861,665 | Owen | June 7, 1932 |
| 2,110,942 | Pequerez | Mar. 15, 1938 |
| 2,602,536 | Eggleston | July 8, 1952 |
| 2,609,917 | Gotthardt | Sept. 9, 1952 |
| 2,744,616 | Shields | May 8, 1956 |